Sept. 22, 1931.   C. R. PATON ET AL   1,824,566
AUTOMOBILE CONSTRUCTION
Filed Jan. 21, 1927
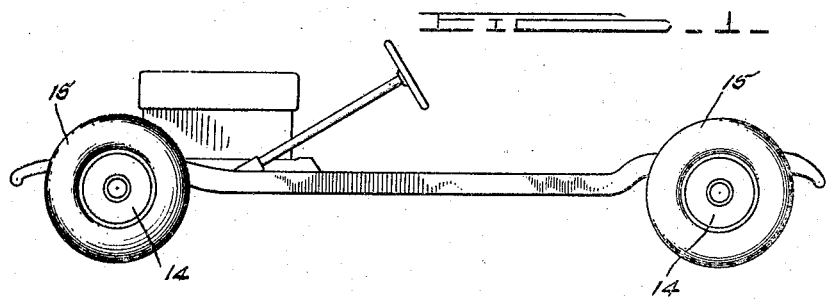
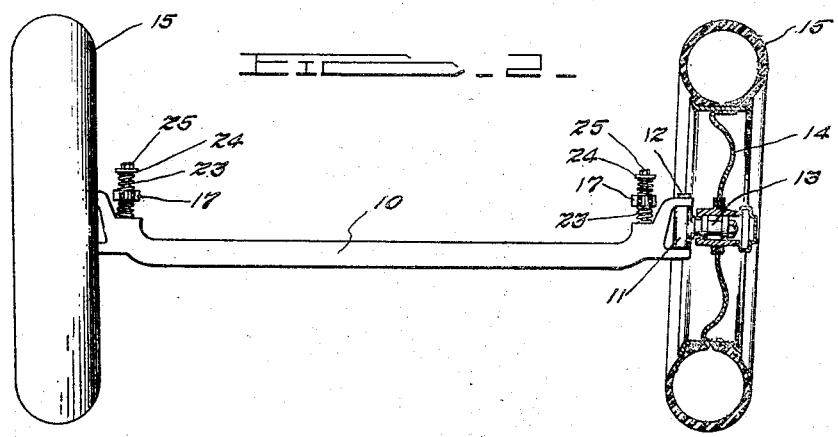
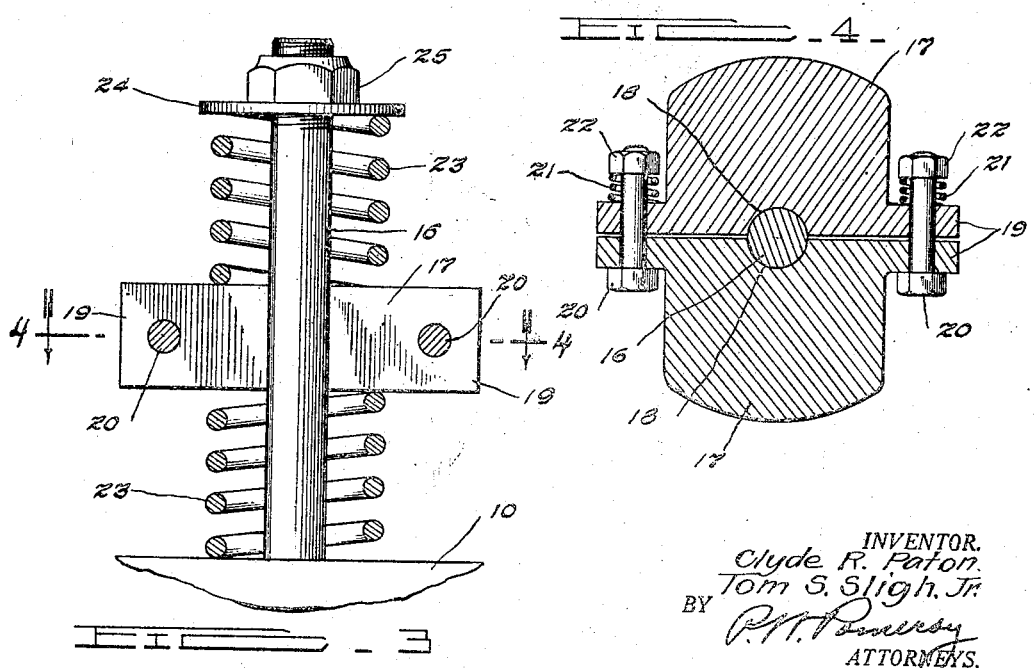
INVENTOR.
Clyde R. Paton.
Tom S. Sligh, Jr.
BY
ATTORNEYS.

Patented Sept. 22, 1931

1,824,566

UNITED STATES PATENT OFFICE

CLYDE R. PATON AND TOM S. SLIGH, JR., OF SOUTH BEND, INDIANA, ASSIGNORS, BY MESNE ASSIGNMENTS, TO PACKARD MOTOR CAR COMPANY, OF DETROIT, MICHIGAN, A CORPORATION OF MICHIGAN

AUTOMOBILE CONSTRUCTION

Application filed January 21, 1927. Serial No. 162,464.

This invention relates to motor vehicles, the principal object being to provide means for elimianting the effect of the tramping of the front wheels thereof.

Another object is to provide means for neutralizing the forces tending to cause tramping of the front wheels of a motor vehicle.

Another object is to provide a vibratory system for absorbing the energy tending to cause tramping of the front wheels of a motor vehicle, and dissipating the energy so absorbed whereby such forces will be prevented from building up to a point where the same are noticeable as tramping.

Another object is to provide, in combination with the front wheels of an automobile subject to those vibratory movements known as tramping, a secondary vibratory system having a natural period of vibration which will take up energy from said wheels and will dissipate the same, whereby tramping of said wheels will be opposed.

Another object is to provide, in combination with the steering wheels of an automobile subject to tramping, a spring-controlled mass having a suitable natural period of vibration, mounted to be affected by said tramping, whereby the mass will absorb energy from said wheels and will be caused to vibrate, means being provided for dissipating the energy so absorbed.

Another object is to provide, in combination with the steering wheels of an automobile, a spring-controlled mass movable with respect to said wheels and having a natural period of vibration bearing a suitable relation to the period of vibration of said wheels when tramping, said mass being capable by reason of the suitable relation of the periods of vibration, of taking up energy from said wheels, with suitable means provided for dissipating this energy by frictionally resisting the motion of said mass.

Another object is to provide, in combination with the front wheels of an automobile subject to tramping, a support positioned to be directly affected by the tramping of said wheels, a spring-controlled mass having a natural period of vibration approximating the period of tramping vibration of said wheels, or a harmonic thereof, slidably supported thereon so as to be set in sympathetic vibration by said tramping vibration, means being provided for frictionally resisting the vibration of said mass whereby the energy absorbed from said wheels will be dissipated.

A further object is to provide, in combination with a motor vehicle subject to tramping, a support positioned adjacent to the steering wheels of said vehicle and vertically movable directly therewith, the axis of said support being positioned parallel to the line of movement of said wheels during tramping, a spring-controlled mass being slidably supported on said support and having a natural period of vibration approximating the period of vibration of said wheels when tramping, or a harmonic thereof, whereby when said wheels tramp said mass will be caused to vibrate in sympathy therewith, and absorb energy therefrom, means being provided for frictionally resisting the vibration of said mass on said support whereby energy absorbed thereby from said wheels will be dissipated.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a side elevation of a motor vehicle chassis incorporating a suitable embodiment of the present invention.

Figure 2 is a front elevation of the front axle and wheels of the motor vehicle shown in Figure 1, illustrating the means for preventing tramping of the wheels applied to the axle.

Figure 3 is an enlarged vertical section taken centrally through one of the devices shown mounted on the axle in Figure 2.

Figure 4 is a sectional view taken on the line 4—4 of Figure 3.

With the advent of low pressure or balloon tires in the motor vehicle industry, that phenomenon known as "tramping", which was relatively unknown before that time, immediately became prominent. "Tramping", at least in the popular sense of the word, is the violent vertical vibration of the steering wheels of an automobile which causes a like movement of the whole front end of such automobile. In other words, there is a torsional or twisting vibration of the front end of the chassis, the axle or any other given point of the chassis vibrating in a vertical transverse plane about the neutral longitudinal axis of the chassis.

Tramping may be caused by any one of a number of different conditions. If a wheel is out of balance it will, while rotating, attempt to rotate about a point eccentric to its spindle, and thereby cause an up and down movement of its spindle. This is one of the causes of tramping. Another cause of tramping may be the unequal flexing qualities of the tire casing such as are exhibited when the overlapping of the fabric therein falls in a localized area. Such a condition may be substantially remedied by increasing the pressure in the tire, but in doing this the advantages of the balloon tire are decreased to a certain extent. Anything that causes the steering wheels to wobble will also cause tramping, due to the alternate raising and lowering of the axle in respect to the wheel by reason of inclined king pins. In this respect, shimmying of the wheels will cause tramping. Road shocks from rough or uneven roads may also cause tramping at certain speeds of vehicles.

In the present invention we have provided a construction which, although it does not remove the cause of tramping, removes the effect thereof to such an extent that it substantially eliminates the same, and does eliminate it so far as all practical results are concerned, without affecting the proper functioning of any part of the vehicle to which it is attached. In doing this we consider the front wheels, which constitute the primary tramping part, as a primary vibratory system having a frequency of vibration equal to the number of vertical reciprocations of the same in a given interval of time (1 sec.) while tramping. We then provide a secondary vibratory system so connected to such wheels as to be affected by the vertical movement thereof, and having a natural frequency of vibration substantially the same or slightly less, than the frequency of vibration of the primary system, or a harmonic thereof. This secondary system is mounted to vibrate in a vertical plane transversely of the longitudinal neutral axis of the automobile, and as we have shown it, the system vibrates substantially in a line which lies normal to a radius and some distance from the said longitudinal neutral axis. The result is that upon vibration or tramping of the primary system, the secondary system is caused to vibrate in sympathy therewith and in opposite phase thereto, and absorbs energy from the primary system. Means is provided for frictionally resisting this sympathetic vibration of the secondary system whereby such energy is dissipated, with the result that the energy tending to cause tramping of the primary system is dissipated and substantially no tramping occurs.

Although such secondary vibratory system may assume many different forms and may be placed in a variety of positions to be affected by the tramping of the primary system and various means may be provided for frictionally resisting the movement of the secondary system to dissipate the energy therein which has been absorbed by the primary system, we show in the accompanying drawings, by way of illustration, one embodiment which successfully accomplishes the result desired. Accordingly we show an automobile front axle 10, to each yoke end of which is secured a steering knuckle 11 by means of a king pin 12. Each steering knuckle 11 is provided with a spindle 13 which rotatably supports and to which is secured a wheel 14 carrying a conventional low pressure or balloon tire 15. As previously described, it is the vertical movement of the wheel 14 which is known as tramping.

Secured adjacent to each end of the axle 10 is an upwardly extending support 16, the axis of which is substantially vertical and parallel to the plane of the wheel 14. Slidably supported on each support 16 is a mass or weight comprising two similar parts or halves 17, each having a depression 18 centrally disposed therein and complementary to the surface of the support 16, the depressions 18 being of such a depth that when the halves 17 are applied to the support 16 in opposed relationship, the adjacent faces of the halves 17 are in slightly spaced relationship with respect to each other. Diametrically opposed ears or flanges 19 are provided on the halves 17 through which bolts 20 extend and receive on their projecting ends the springs 21 and nuts 22, the nuts 22 being drawn up to such an extent that the springs 21 cause the flanges 19 to be drawn toward each other whereby the halves 17 are caused to frictionally embrace the support 16, but it is understood, of course, with not sufficient force to prevent a dampened sliding action of the halves 17 vertically on the support 16. Encircling each support 16 on either side of the halves 17 are springs 23, the lower spring 23 being confined in partly compressed state between the halves 17 and the upper face of the axle 10, and the upper spring 23 being confined in partly compressed space between the halves 17 and the washer 24 held against displacement adjacent the upper end of the support 16 by the nut 25.

The springs 23 are so proportioned with respect to the halves or weights 17 that a natural period of vibration is given to the weights 17 on the support 16 approximately equal to the period of tramping vibration of the wheels 14, or a harmonic thereof. The result is that as soon as the wheels 14 begin to tramp, the weights 17 are caused to vibrate vertically on the support 16 in sympathy therewith. The energy which causes the weights 17 to thus vibrate is, of course, absorbed from the wheels 14. Inasmuch as the weights 17 frictionally embrace the supports 16, a friction is set up between the same and the supports 16 and the energy in the weights 17 necessary to overcome this friction during vibration is dissipated thereby. The energy in the weights 17 thus absorbed from the wheels 14 is dissipated by this friction. The amount of friction between the weights 17 and supports 16 may, of course, be varied by adjusting the nuts 22 on the bolts 20 so as to cause the weights 17 to embrace the supports 16 with a greater or lesser amount of friction. We have found that the energy necessary to be dissipated by the weights 17 is relatively small if the tramping is checked in its incipient stages and prevented from building up to a point where it is apparent to the occupants of the vehicle of which it forms a part. For this reason but very slight friction is necessary between the weights 17 and supports 16, and by absorbing the forces tending to cause tramping such forces are prevented from building up and no noticeable tramping of the wheels occurs.

It is to be noted that the present invention does not aim to eliminate the cause of tramping, nor does it attempt to eliminate tramping completely, but it does contemplate the control of the forces tending to cause tramping and keeping these forces to such a small value that the effects thereof are eliminated so far as practical results are concerned. This will be apparent when it is seen that unless there is some vibration of the secondary system no energy will be dissipated, and unless there is some vibration of the wheels, there will be no vibration of the secondary system. However, if the secondary system is in proper working condition, the slightest tramping vibration of the primary system will set the secondary system in motion and will prevent the forces tending to cause tramping from building up to a point where it has any noticeable effect on the automobile of which it forms a part.

Formal changes may be made in the specific embodiment of the invention described without departing from the spirit and substance of the broad invention, the scope of which is commensurate with the appended claims.

What we claim is:

1. In combination with an automobile subject to tramping, a vertically extending support carried by the front axle thereof, a mass slidably mounted on said support, spring means co-operating with said mass imparting thereto a natural period of vibration causing said mass to vibrate in sympathy with said tramping movement, and means for frictionally resisting movement of said mass.

2. In combination with those parts of an automobile subject to tramping including a front axle, a pair of approximately vertically extending supports carried by said axle adjacent the wheels supported thereby, a mass slidably mounted on each of said supports, spring means co-operating with each of said masses and so proportioned in respect thereto as to impart to said masses a natural period of vibration approximating the period of tramping vibration of said axle, and means for frictionally resisting the vibratory movement of said masses on said supports.

3. In an automobile, in combination, the parts thereof subject to tramping movement, and means for preventing the building up of said tramping movement comprising a mass supported on said parts and guided for yielding vibratory movement substantially in a line which lies normal to a radius and some distance from the longitudinal neutral axis of the automobile and which lies in a vertical plane transversely of such axis.

4. In combination with those parts of an automobile subject to tramping movement, a pair of supports carried by said parts and extending in a substantially vertical transverse plane and substantially normal to radii from the longitudinal neutral axis of the automobile, a mass slidably mounted on each of said supports, and spring means cooperating with each of said masses and giving a natural period of vibration thereto approximating the period of tramping vibration of said parts.

5. In an automobile, in combination, the parts thereof subject to tramping movement, a mass mounted on said parts and guided for vibratory movement in a substantially vertical transverse plane and in a line substantially normal to a radius from the longitudinal neutral axis of the automobile, and spring means co-operating with said mass and controlling its vibratory movement.

6. In an automobile, in combination, the parts thereof subject to tramping movement, a plurality of masses mounted on said parts remote from each other, said masses being guided for vibratory movement in a substantially vertical transverse plane and normal to radii from the longitudinal neutral axis of the automobile, and spring means for each of said masses controlling the vibratory movements thereof.

7. In an automobile, in combination, the frame, front axle and wheels thereof subject to tramping movement, a mass mounted on one of said parts adjacent one of said wheels and remote from the longitudinal neutral axis of the automobile, said mass mounted for substantially vertical vibratory movement, and spring means cooperating with said mass and controlling its vibratory movement.

Signed by us at South Bend, Indiana, this 17th day of January, 1927.

CLYDE R. PATON.
TOM S. SLIGH, Jr.